United States Patent
Yamashita (10) Patent No.: US 11,326,225 B2
(45) Date of Patent: May 10, 2022

(54) METAL SHEET PRODUCING METHOD AND METAL SHEET PRODUCING APPARATUS

(71) Applicant: TOYOTA JIDOSHA KABUSHIKI KAISHA, Toyota (JP)

(72) Inventor: Osamu Yamashita, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 29 days.

(21) Appl. No.: 16/881,503

(22) Filed: May 22, 2020

(65) Prior Publication Data

US 2020/0385838 A1 Dec. 10, 2020

(30) Foreign Application Priority Data

Jun. 4, 2019 (JP) .............................. JP2019-104606

(51) Int. Cl.
*C21D 9/46* (2006.01)
*C21D 9/00* (2006.01)
*C22C 45/02* (2006.01)
*H02K 1/12* (2006.01)

(52) U.S. Cl.
CPC ............. *C21D 9/46* (2013.01); *C21D 9/0068* (2013.01); *C22C 45/02* (2013.01); *C21D 2201/03* (2013.01); *C22C 2202/02* (2013.01); *H02K 1/12* (2013.01)

(58) Field of Classification Search
None
See application file for complete search history.

(56) References Cited

U.S. PATENT DOCUMENTS

| 2004/0048157 | A1* | 3/2004 | Neudecker | .......... | H01M 4/0426 |
| | | | | | 429/231.2 |
| 2008/0196795 | A1* | 8/2008 | Waeckerle | .......... | H01F 41/0226 |
| | | | | | 148/540 |
| 2017/0229237 | A1 | 8/2017 | Makino et al. | | |
| 2018/0152087 | A1* | 5/2018 | Takahashi | ............ | C21D 8/1272 |

FOREIGN PATENT DOCUMENTS

JP 2017-141508 A 8/2017

\* cited by examiner

*Primary Examiner* — Brian D Walck
(74) *Attorney, Agent, or Firm* — Sughrue Mion, PLLC (57) ABSTRACT

There is provided a metal sheet producing method that can avoid a decrease in magnetic properties. The metal sheet producing method is a method for producing metal sheets by applying heat treatment to metal sheets made of amorphous soft magnetic material while conveying the metal sheets along a bar and thus crystallizing the amorphous soft magnetic material into nano-crystal soft magnetic material. The method includes attaching the plurality of metal sheets in a laminated state to an upstream portion of the bar, separating the plurality of metal sheets from each other using magnetic force and moving the metal sheets while applying heat treatment thereto so as to allow them to pass by a midstream portion of the bar, and sequentially laminating the metal sheets that have passed by the midstream portion on a downstream portion of the bar.

3 Claims, 6 Drawing Sheets

METAL SHEET PRODUCING METHOD AND METAL SHEET PRODUCING APPARATUS

CROSS REFERENCE TO RELATED APPLICATIONS

The present application claims priority from Japanese patent application JP 2019-104606 filed on Jun. 4, 2019, the entire content of which is hereby incorporated by reference into this application.

BACKGROUND

Technical Field

The present disclosure relates to a metal sheet producing method and a metal sheet producing apparatus for producing metal sheets by applying heat treatment to metal sheets made of amorphous soft magnetic material and thus crystallizing the amorphous soft magnetic material into nano-crystal soft magnetic material.

Background Art

Traditionally, nano-crystal soft magnetic material is used for magnetic cores of motors and the like. The nano-crystal soft magnetic material can be obtained by applying heat treatment to amorphous soft magnetic material at a crystallization temperature. As such a heat treatment method, there is known a method of applying heat treatment to a plurality of metal sheets made of amorphous soft magnetic material in a laminated state (for example, see JP 2017-141508 A).

SUMMARY

However, applying heat treatment to a plurality of metal sheets made of amorphous soft magnetic material in a laminated state may cause an excessive temperature rise of the metal sheets due to the accumulation of heat of reaction through crystallization, resulting in generation of coarse crystals. This is problematic in that the magnetic properties would decrease.

In view of the foregoing, the present disclosure provides a metal sheet producing method and a metal sheet producing apparatus that can avoid a decrease in the magnetic properties.

A metal sheet producing method in accordance with the present disclosure is a method for producing metal sheets by applying heat treatment to metal sheets made of amorphous soft magnetic material while conveying the metal sheets along a bar and thus crystallizing the amorphous soft magnetic material into nano-crystal soft magnetic material, the method including: attaching the plurality of metal sheets in a laminated state to an upstream portion of the bar, separating the plurality of metal sheets from each other using magnetic force and moving the metal sheets while applying the heat treatment thereto so as to allow the metal sheets to pass by a midstream portion of the bar, and sequentially laminating the metal sheets that have passed by the midstream portion on a downstream portion of the bar.

The metal sheet producing method of the present disclosure includes a step of separating the plurality of metal sheets from each other using magnetic force and moving the plurality of metal sheets while applying heat treatment thereto. Accordingly, a gap can be formed between the adjacent metal sheets unlike the case where heat treatment is applied to the plurality of metal sheets in a laminated state, and therefore, heat of reaction generated through crystallization would not accumulate and can be discharged into the gap. Since this configuration can suppress generation of coarse crystals, it is possible to avoid a decrease in the magnetic properties of the metal sheets.

The metal sheet producing method of the present disclosure includes a step of moving the plurality of metal sheets while applying heat treatment thereto so as to allow them to pass by the midstream portion of the bar and a step of sequentially laminating the metal sheets that have passed by the midstream portion on a downstream portion of the bar. These steps can increase productivity because heat treatment can be continuously applied to the plurality of metal sheets. In addition, since the plurality of metal sheets can return to the laminated state after the heat treatment, the metal sheets can be easily detached from the bar.

In the metal sheet producing method, the metal sheets may be moved downstream by vibrations given to the bar with at least the upstream portion and the midstream portion being inclined downward toward the downstream side, and further, the metal sheets may be separated from each other by the magnetic force of magnets that are disposed to extend along the midstream portion and sandwich the midstream portion. This configuration allows the metal sheets attached to the upstream portions of the bars to easily pass by the midstream portion while being separated from each other and then move to the downstream portion.

In the metal sheet producing method, the magnets that are disposed to sandwich the midstream portion may be moved from the upstream side to the downstream side along the midstream portion, so as to separate the metal sheets from each other using the magnetic force of the magnets and move the metal sheets downstream. This configuration allows the metal sheets attached to the upstream portion of the bar to easily pass by the midstream portion while being separated from each other and then move to the downstream portion. Further, controlling the moving speed of the magnets can easily control the heat treatment time of the metal sheets. This configuration is particularly useful for the material requiring strict management of the heat treatment time.

A metal sheet producing apparatus in accordance with the present disclosure is an apparatus for producing metal sheets by applying heart treatment to metal sheets made of amorphous soft magnetic material while conveying the metal sheets along a bar and thus crystallizing the amorphous soft magnetic material into nano-crystal soft magnetic material, the apparatus including: a conveying device including a bar and a magnet, the bar including an upstream portion to which the plurality of metal sheets in a laminated state is adapted to be attached, a midstream portion by which the metal sheets are adapted to pass, and a downstream portion on which the metal sheets having passed by the midstream portion are adapted to be laminated, the magnet being adapted to separate the plurality of metal sheets attached to the upstream portion of the bar from each other using magnetic force, the conveying device being adapted to move the metal sheets being separated from each other along the bar, and a heating device adapted to apply the heat treatment to the metal sheets while they are passing by the midstream portion of the bar.

The metal sheet producing apparatus of the present disclosure includes magnets that are adapted to separate the plurality of metal sheets attached to the upstream portion of the bar from each other using magnetic force, and a heating device adapted to apply the heat treatment to the metal sheets while they are passing by the midstream portion of the bar. Accordingly, a gap can be formed between the adjacent metal sheets by the magnets unlike the case where heat treatment is applied to the plurality of metal sheets in a laminated state by the heating device, and therefore, heat of reaction generated through crystallization would not accumulate and can be discharged into the gap. Since this configuration can suppress generation of coarse crystals, it is possible to avoid a decrease in the magnetic properties of the metal sheets.

Further, since the heating device, which is adapted to apply heat treatment to the metal sheets while they are passing by the midstream portion of the bar, allows the heat treatment to be continuously applied to the plurality of metal sheets while they are conveyed by the conveying device, productivity can be increased. In addition, since the bar, which includes the downstream portion on which the metal sheets are adapted to be laminated after they have passed by the midstream portion, allows the plurality of metal sheets to return to the laminated state after the heat treatment, the metal sheets can be easily detached from the bar.

In the metal sheet producing apparatus, the conveying device may include a vibrator that is adapted to give vibrations to the bar, at least the upstream portion and the midstream portion may be inclined downward toward the downstream side, and the magnets may be disposed to extend along the midstream portion and sandwich the midstream portion. This configuration allows the metal sheets to move downstream by vibrations given to the bar and to be separated from each other by the magnetic force of the magnets. Accordingly, the metal sheets attached to the upstream portion of the bar can easily pass by the midstream portion while being separated from each other and then move to the downstream portion.

In the metal sheet producing apparatus, the magnets may be disposed to sandwich the midstream portion and may be adapted to move along the midstream portion from the upstream side to the downstream side. This configuration allows the magnets to move from the upstream side to the downstream side along the midstream portion, so as to separate the metal sheets from each other using the magnetic force of the magnets and move the metal sheets downstream. Accordingly, the metal sheets attached to the upstream portion of the bar can easily pass by the midstream portion while being separated from each other and then move to the downstream portion. Further, controlling the moving speed of the magnets can easily control the heat treatment time of the metal sheets. This configuration is particularly useful for the material requiring strict management of the heat treatment time.

According to the metal sheet producing method and the metal sheet producing apparatus of the present disclosure, it is possible to avoid a decrease in the magnetic properties of the metal sheets.

DETAILED DESCRIPTION

Hereinafter, a metal sheet producing method and a metal sheet producing apparatus in accordance with embodiments of the present disclosure will be described.

First Embodiment

Figure 1:
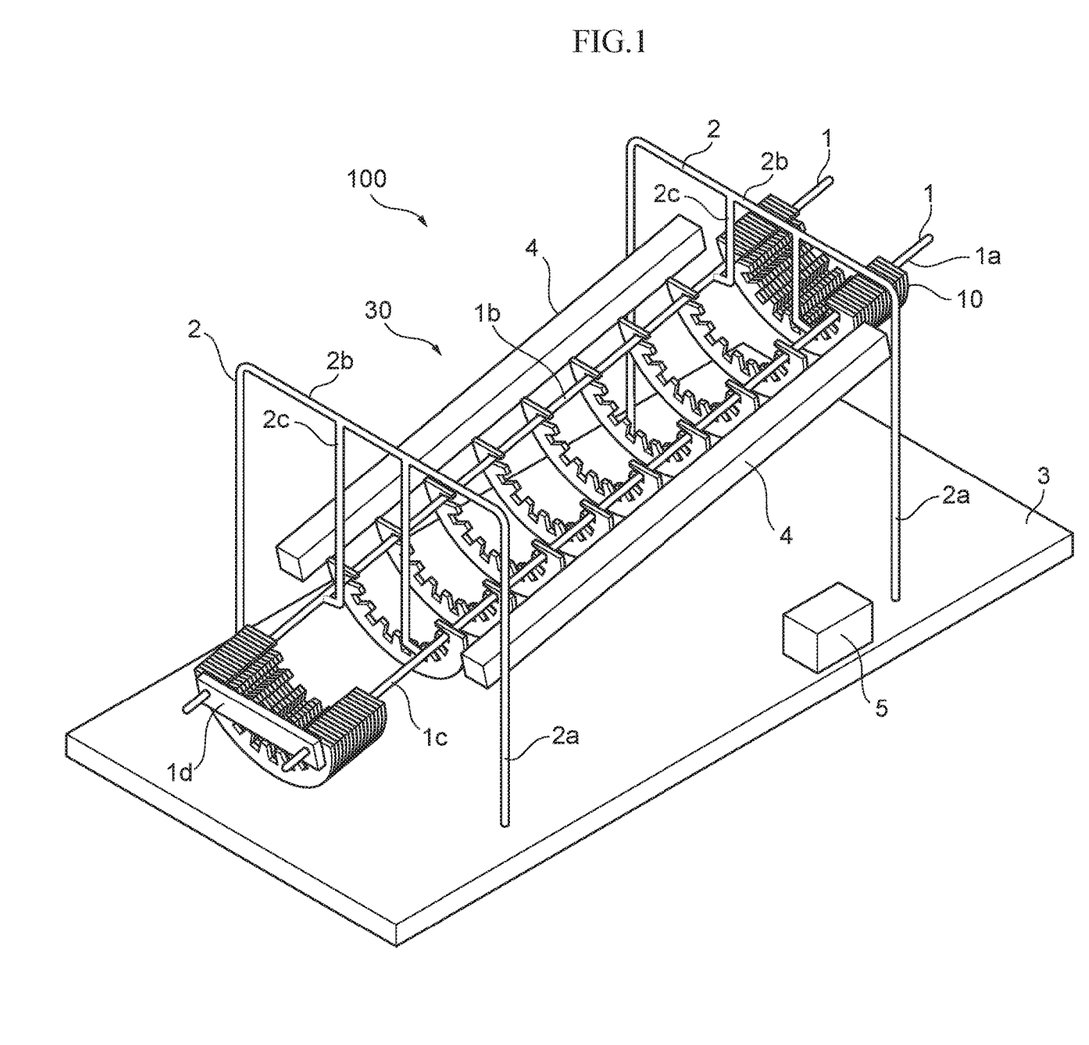
FIG. 1 is a schematic configuration view of a producing apparatus used for producing metal sheets in accordance with a first embodiment of the present disclosure.

First, a producing apparatus 100 used for producing metal sheets 10 in accordance with a first embodiment of the present disclosure will be described with reference to FIG. 1. FIG. 1 is a schematic configuration view of the producing apparatus 100 used for producing the metal sheets 10 in accordance with the first embodiment of the present disclosure. It should be noted that cooling members 6 and a heating device 7 are omitted in FIG. 1 to facilitate understanding.

The producing apparatus 100 is an apparatus for applying heat treatment to the metal sheets 10 made of amorphous soft magnetic material while conveying the metal sheets 10 along bars 1 so as to crystallize the amorphous soft magnetic material into nano-crystal soft magnetic material. The producing apparatus 100 includes a pair of bars 1, a pair of supporting members 2 supporting the pair of bars 1, a base plate 3 to which the supporting members 2 are fixed, a pair of magnets 4 disposed along the pair of bars 1, a vibrator 5 mounted on the base plate 3, and a heating device 7. In the present embodiment, the bars the magnets 4, and the vibrator 5 form a conveying device 30 that allows the metal sheets 10 being separated from each other to move along the bars 1, as will be described later.

Each of the bars 1 is formed of a metal member having a circular cross section. The bar 1 may be formed of a material other than metal as long as it has a predetermined thermal resistance and strength. Each of the bars 1 includes an upstream portion 1a to which the metal sheets 10 made of amorphous soft magnetic material (i.e., the metal sheets 10 before being subjected to heat treatment) are attached, a midstream portion 1b by which the metal sheets 10 being separated from each other pass while being subjected to heat treatment, and a downstream portion 1c on which the metal sheets 10 having been crystallized into nano-crystal soft magnetic material (i.e., the metal sheets 10 after heat treatment) are sequentially laminated.

Figure 2:
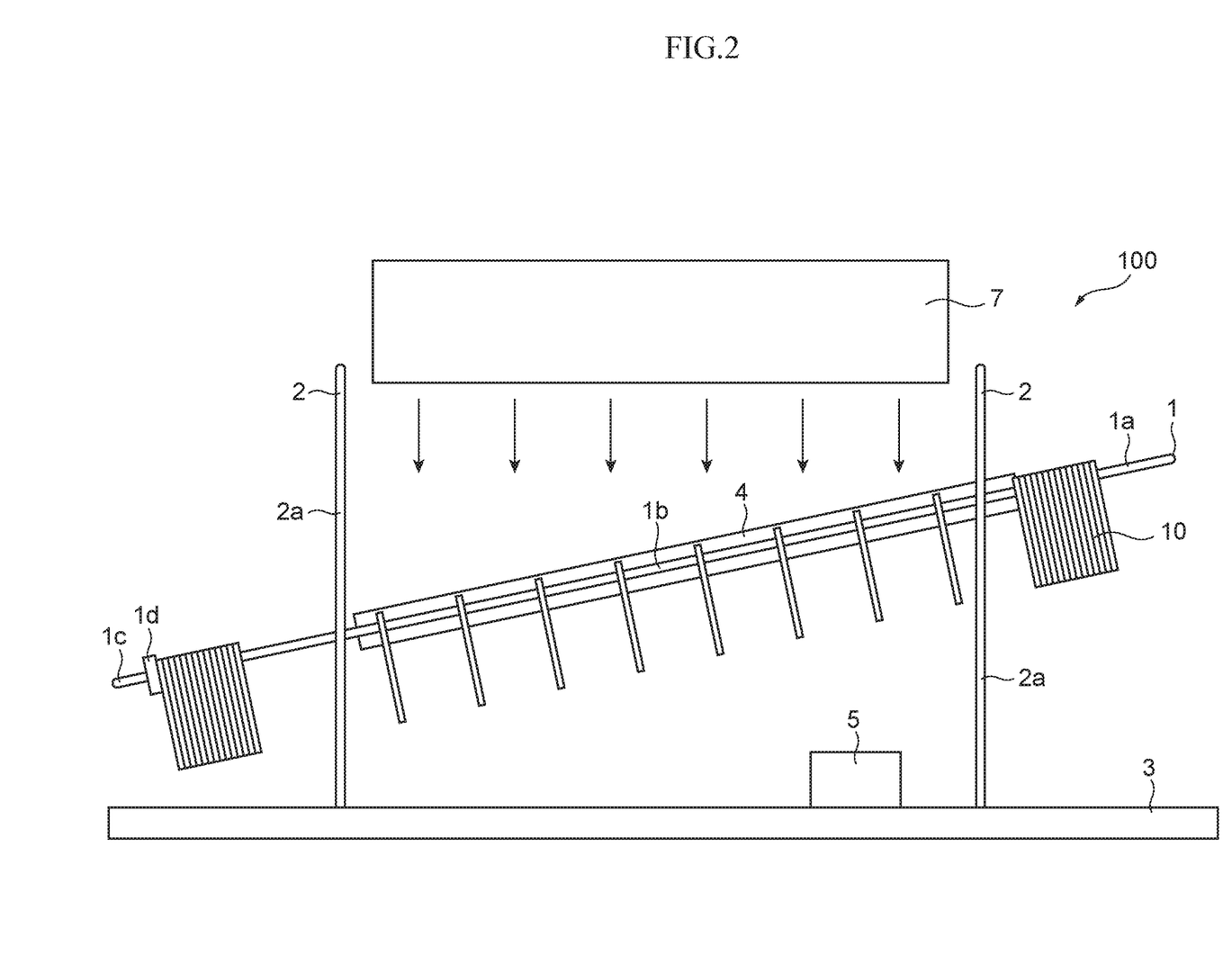
FIG. 2 is a schematic side view of the producing apparatus used for producing metal sheets in accordance with the first embodiment of the present disclosure.

As illustrated in FIG. 2, the entire bar 1 (including the upstream portion 1a, the midstream portion 1b, and the downstream portion 1c) is disposed to be inclined downward from the upstream side (the right side of FIG. 2) toward the downstream side (the left side of FIG. 2) in the present embodiment. It should be noted that the cooling members 6 and the magnet 4 in the front side of FIG. 2 are omitted in FIG. 2 to facilitate understanding. Further, the downstream portion 1c of the bar 1 has at its predetermined position a stopper 1d that limits the movement of the metal sheets 10 toward the downstream side. Instead of providing the stopper 1d, it is also possible to provide a bent portion at a predetermined position of the downstream portion 1c to limit the movement of the metal sheets 10 toward the downstream side.

As illustrated in FIG. 1, each of the supporting members 2 includes a pair of columns 2a provided perpendicularly to the base plate 3, a coupling portion 2b that couples the upper ends of the pair of columns 2a, and a pair of suspending portions 2c, which extend downward from predetermined positions of the coupling portion 2b, for supporting the bars 1.

Figure 3:
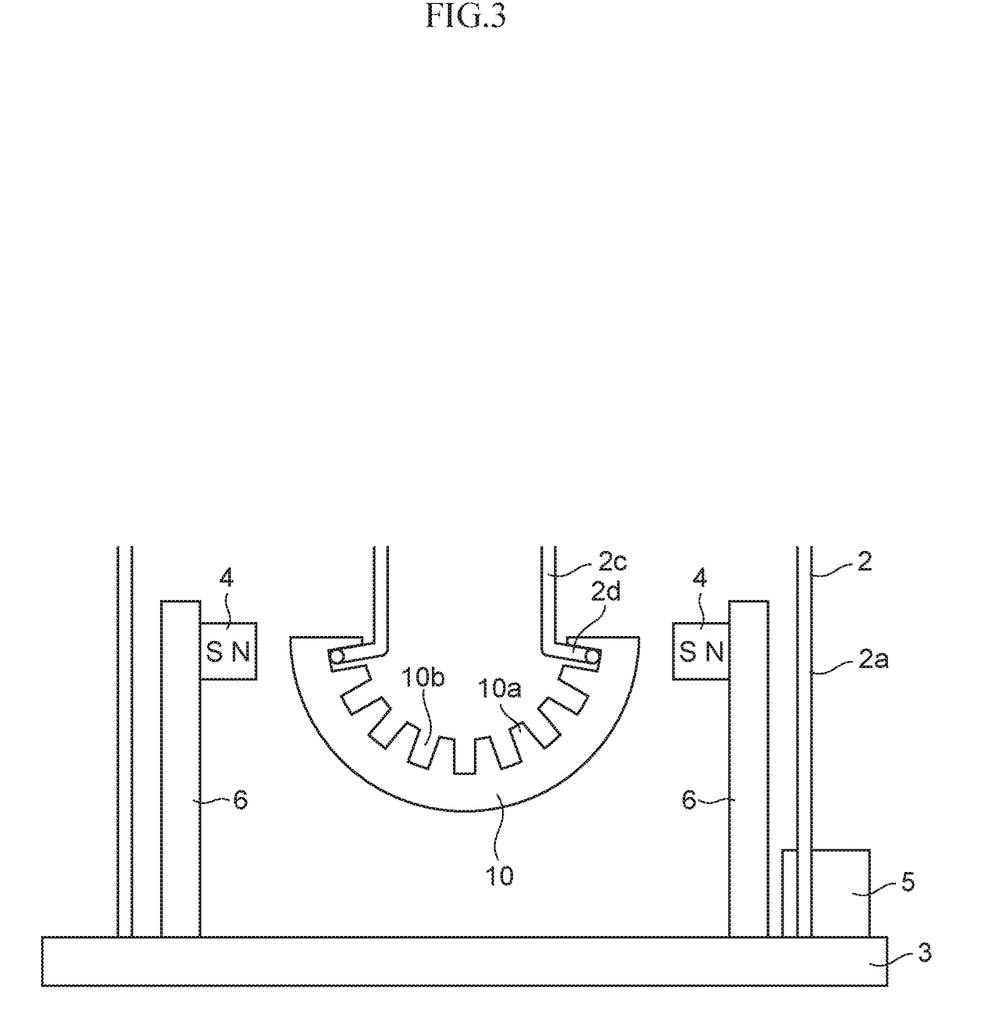
FIG. 3 is a view of the producing apparatus used for producing metal sheets in accordance with the first embodiment of the present disclosure, as viewed from the downstream side.

As illustrated in FIG. 3, the metal sheets 10 are formed in a semi-fan shape (or semi-arc shape) and have a plurality of protruding portions 10a that protrude inward in the radial direction and a gap 10b formed between the adjacent protruding portions 10a. Tip portions (i.e., lower ends) 2d of the suspending portions 2c of the supporting members 2 are bent at an angle that allows the tip portions 2d to pass through the gaps 10b of the metal sheets 10. Accordingly, the metal sheets 10 can move from the upstream side to the downstream side along the bars 1 without being interfered with the supporting members 2. It should be noted that when the metal sheets 10 are laminated and used for a stator core of a motor, the protruding portions 10a and the gaps 10b respectively serve as teeth and slots of the stator core, as will be described later.

As illustrated in FIG. 1, the pair of magnets 4 is disposed to extend along the midstream portions 1b of the bars 1 and sandwich the midstream portions 1b from opposing sides in the width direction of the metal sheets 10, which is perpendicular to the direction in which the metal sheets 10 are conveyed. It should be noted that the magnets 4 are disposed in parallel with the bars 1. As illustrated in FIG. 3, a space is formed between each magnet 4 and the metal sheets 10 so that the metal sheets 10 move along the bars 1 without coming into contact with the magnet 4.

The magnet 4 is a permanent magnet and made of, for example, a samarium-cobalt magnet mainly including samarium and cobalt, an alnico magnet, and the like. Other than these magnets, the magnet 4 may be made of, for example, a neodymium magnet mainly including neodymium, iron, and boron, a ferrite magnet, and the like. In addition, the magnet 4 may be an electromagnet including an iron core and a coil.

As illustrated in FIG. 3, the pair of cooling members 6, to which the magnets 4 are fixed, is disposed upward on the upper face of the base plate 3. Each of the cooling members 6 is formed of a metal plate and provided with a cooling water channel (not illustrated) that passes cooling water therethrough. Passing cooling water through the inside of the cooling members 6 can avoid an excessive temperature rise of the magnets 4 caused by heat generated during the heat treatment and can suppress a reduction in magnetic force.

The vibrator 5 is adapted to vibrate the bars 1 and is fixed to the upper face of the base plate 3 herein. It should be noted that the vibrator 5 may be fixed to, for example, an end of the bar 1 or the supporting member 2. The vibrator 5 may generate vibrations, for example, in a direction along the bars 1 or in a direction perpendicular to the direction in which the bars 1 extend (i.e., in the vertical or width direction). The vibrator 5 generates vibrations greater than or equal to 50 Hz and less than or equal to 150 Hz, for example. While the vibrator 5 gives vibrations to the bars 1, the metal sheets 10 move (i.e., are conveyed) gradually from the upstream side to the downstream side of the bars 1 due to their own weight and the vibrations.

As illustrated in FIG. 2, the heating device 7 is disposed above the midstream portions 1b of the bars 1, and has a heating portion (not illustrated) and a fan (not illustrated) that blows downward the gas heated by the heating portion. When the heating device 7 blows hot air (heated gas) onto the metal sheets 10, the temperature of the metal sheets 10 reaches the crystallization temperature or higher, whereby the amorphous soft magnetic material is crystallized into nano-crystal soft magnetic material.

It is desirable that the metal sheets 10 around the upstream portions 1a and the downstream portions 1c of the bars 1 would not be heated to a predetermined temperature or higher by the heating device 7. More specifically, a heating furnace (not illustrated) may be provided so as to surround the midstream portions 1b of the bars 1 and the magnets 4 (i.e., so as to surround an area sandwiched by the pair of supporting members 2 in FIG. 1, for example). Further, an exhaust duct (not illustrated) may be provided in a predetermined position so that the hot air from the heating device 7 is not directed to the upstream portions 1a or the downstream portions 1c of the bars 1.

Next, a method for producing the metal sheets 10 using the producing apparatus 100 will be described.

Preparing Step

First, the metal sheets 10 having a predetermined shape are formed by punching a sheet material made of amorphous soft magnetic material. It should be noted that the metal sheets 10 are subjected to heat treatment in a heat treatment step to be crystallized into nano-crystal soft magnetic material (which will be described later). The plurality (for example, several thousands) of metal sheets 10 obtained by punching the sheet material is laminated. The metal sheets 10 are used for a rotor core or a stator core of an interior permanent magnet motor (IPM motor), for example. Herein, an example in which the metal sheets 10 are used for a stator core will be described.

Examples of the amorphous soft magnetic material and nano-crystal soft magnetic material include, but are not limited to, material containing at least one magnetic metal selected from the group consisting of Fe, Co, and Ni and at least one non-magnetic metal selected from the group consisting of B, C, P, Al, Si, Ti, V, Cr, Mn, Cu, Y, Zr, Nb, Mo, Hf, Ta, and W.

Typical examples of the amorphous soft magnetic material and nano-crystal soft magnetic material include, but are not limited to, a FeCo-based alloy (e.g., FeCo and FeCoV), a FeNi-based alloy (e.g., FeNi, FeNiMo, FeNiCr, and FeNiSi), a FeAl-based alloy or a FeSi-based alloy (e.g., FeAl, FeAlSi, FeAlSiCr, FeAlSiTiRu, and FeAlO), a FeTa-based alloy (e.g., FeTa, FeTaC, and FeTaN) and a FeZr-based alloy (e.g., FeZrN).

As another example of the amorphous soft magnetic material and nano-crystal soft magnetic material, a Co-based alloy containing Co and at least one of Zr, Hf, Nb, Ta, Ti, or Y may be used. The Co-based alloy may contain at least 80 at % of Co. Such a Co-based alloy is likely to become an amorphous state when it is deposited as a film, and exhibits excellent soft magnetism because it has small magnetocrystalline anisotropy and few crystal defects and grain boundaries. Examples of the amorphous soft magnetic material include CoZr, CoZrNb, and CoZrTa-based alloys.

The amorphous soft magnetic material is soft magnetic material having an amorphous structure as a main structure. In the amorphous structure, no clear peak appears in an X-ray diffraction pattern, and only a broad halo pattern can be observed. Meanwhile, a nano-crystal structure can be formed by applying heat treatment to the amorphous structure, and in a nano-crystal soft magnetic material having a nano-crystal structure, a diffraction peak can be observed in a position corresponding to a gap between lattice points on the crystal plane. Based on the width of the diffraction peak, the crystallite size can be calculated with the Scherrer equation.

Nano-crystals typically refer to the ones having a crystallite size of less than 1 μm as calculated with the Scherrer equation based on the full width at half maximum (FWHM) of a diffraction peak of an X-ray diffraction pattern. In the present embodiment, the crystallite size of each nano-crystal (the crystallite size as calculated with the Scherrer equation based on the full width at half maximum (FWHM) of a diffraction peak of an X-ray diffraction) may be less than or equal to 100 nm, or less than or equal to 50 nm. In addition, the crystallite size of each nano-crystal may be greater than or equal to 5 nm. Nano-crystals with a crystallite size within such a range can have improved soft magnetic properties. Meanwhile, the crystallite size of an electromagnetic steel sheet used for a rotor core of a conventional interior permanent magnet motor (IPM motor) is of the order of μm, and typically greater than or equal to 50 μm.

The amorphous soft magnetic material can be obtained by, for example, melting metal material, which has been prepared to have the above-mentioned composition, at a high temperature in a high-frequency melting furnace or the like to obtain a uniform molten metal and quenching the result. The quenching rate is, for example, about $10^{6\circ}$ C./sec, though it depends on the material used. However, the quenching rate is not particularly limited as long as an amorphous structure can be obtained before the material crystallizes. For example, the sheet material made of amorphous soft magnetic material is formed into a strip sheet made of amorphous soft magnetic material by blowing the molten metal of the metal material onto a rotating cooling roll, and then the sheet is wound around a shaft portion of a feeding device. In this manner, quenching the molten metal can obtain soft magnetic material having an amorphous structure before the material crystalizes. The sheet material may have a thickness in the range from 5 to 50 μm or in the range from 15 to 35 μm, for example.

Attaching Step

The plurality (for example, several thousands) of metal sheets 10 made of amorphous soft magnetic material is attached in a laminated state to the upstream portions 1a of the bars 1. The process of attachment of the metal sheets 10 to the bars 1 may be automated, for example, by a robot. It should be noted that the process of attachment of the metal sheets 10 to the bars 1 may be performed by an operator.

Heat Treatment Step

While the vibrator 5 gives vibrations to the bars 1, the metal sheets 10 move (i.e., are conveyed) gradually from the upstream side to the downstream side of the bars 1 due to their own weight and the vibrations. Then, when the metal sheets 10 move to a position sandwiched between the pair of magnets 4, magnetic poles are generated at the ends of the metal sheets 10 (the portions close to the magnets 4) by the magnetic force of the magnets 4. Since the magnetic poles generated at the ends of the adjacent metal sheets 10 are the same, the adjacent metal sheets 10 repel each other and become separated from each other. Accordingly, the metal sheets 10 being separated from each other move along the bars 1. That is, the metal sheets 10 move in a laminated state in an area upstream of the magnets 4, while the metal sheets 10 continuously move with a predetermined gap therebetween by the magnetic force in an area sandwiched between the pair of magnets 4.

The metal sheets 10 are subjected to heat treatment by the heating device 7 while passing by the midstream portions 1b of the bars 1. It should be noted that the heat treatment step is an example of "moving the metal sheets while applying heat treatment thereto so as to allow them to pass by the midstream portion of the bar" in accordance with the present disclosure.

Typically, nano-crystal soft magnetic material can be obtained by heating amorphous soft magnetic material and thus crystallizing (or altering) it. That is, the amorphous structure of soft magnetic material that has undergone heat treatment changes to a nano-crystal structure.

The conditions of heat treatment to crystallize amorphous soft magnetic material into nano-crystal soft magnetic material are not particularly limited. The conditions may be appropriately selected in consideration of the composition of metal material and the desired magnetic properties to be exhibited. Therefore, the temperature of the heat treatment is higher than the crystallization temperature of the soft magnetic material to be used, for example, though not particularly limited thereto. Accordingly, applying heat treatment to the amorphous soft magnetic material allows the amorphous soft magnetic material to change into nano-crystal soft magnetic material. The heat treatment may be performed in an inert gas atmosphere.

When the heat treatment is performed in an inert gas atmosphere, the gas sent out from the heating device 7 may be an inert gas. Further, the aforementioned heating furnace (not illustrated) may be filled with an inert gas. Examples of the inert gas include, but are not limited to, nitrogen gas and argon gas.

The crystallization temperature is a temperature at which crystallization occurs. Since exothermic reaction occurs during crystallization, the crystallization temperature may be determined by measuring the temperature of heat generated along with the crystallization. For example, the crystallization temperature can be measured under the condition of a predetermined heating rate (e.g., 0.67 $Ks^{-1}$) using differential scanning calorimetry (DSC). The crystallization temperature of amorphous soft magnetic material is, for example, from 300 to 500° C., though it differs depending on the material used. Similarly, the crystallization temperature of nano-crystal soft magnetic material can also be measured using differential scanning calorimetry (DSC). Although nano-crystal soft magnetic material already has crystals generated therein, crystallization further progresses if the nano-crystal soft magnetic material is heated to the crystallization temperature or higher. The crystallization temperature of nano-crystal soft magnetic material is, for example, from 300 to 500° C., though it differs depending on the material used.

The heating temperature to crystalize amorphous soft magnetic material into nano-crystal soft magnetic material is not particularly limited as long as it is greater than or equal to the temperature at which amorphous soft magnetic material crystallizes into nano-crystal soft magnetic material. For example, the heating temperature may be set greater than or equal to 350° C., or greater than or equal to 400° C. Setting the heating temperature to 400° C. or higher allows crystallization to progress efficiently. In addition, the heating temperature may be less than or equal to 600° C., or less than equal to 520° C., for example. Setting the heating temperature to 520° C. or lower can more easily avoid excessive crystallization and suppress generation of by-products (for example, $Fe_2B$).

The heating time for the heat treatment step is not particularly limited, but may be not shorter than 1 second and not longer than 10 minutes, or not shorter than 1 second and not longer than 5 minutes.

Laminating Step

The metal sheets 10 after having passed by the midstream portions 1b reach the downstream portions 1c of the bars 1 and become free from the magnetic force of the magnets 4. Accordingly, the magnetic poles having been generated at the ends of the metal sheets 10 disappear, whereby the metal sheets 10 are sequentially laminated on each other. At this time, since the metal sheets 10 are sequentially laminated at a sufficiently low temperature, heat would not accumulate in the laminated metal sheets 10. It should be noted that in order to sequentially laminate the metal sheets 10 at a sufficiently low temperature, a cooling device (not illustrated) such as a blower may be provided around the downstream portions 1c of the bars 1.

Detaching Step

In the detaching step, when all of the metal sheets 10 attached to the bars 1 in the attaching step have moved to the downstream portions 1c (or when the number of metal sheets 10 on the downstream portions 1c reaches a predetermined number), the plurality of metal sheets 10 in the laminated state is detached from the downstream portions 1c. At this time, the metal sheets 10 can be easily detached from the bars 1 by, for example, causing the supporting members 2 to warp so that the pair of bars 1 comes close to each other. The process of detaching the metal sheets 10 from the bars 1 may be automated, for example, by a robot. It should be noted that the process of detaching the metal sheets 10 from the bars 1 may be performed by an operator.

Hereinafter, a method for producing a motor using the laminated metal sheets 10, which have been detached from the bars 1 in the detaching step, will be briefly described.

Figure 4:
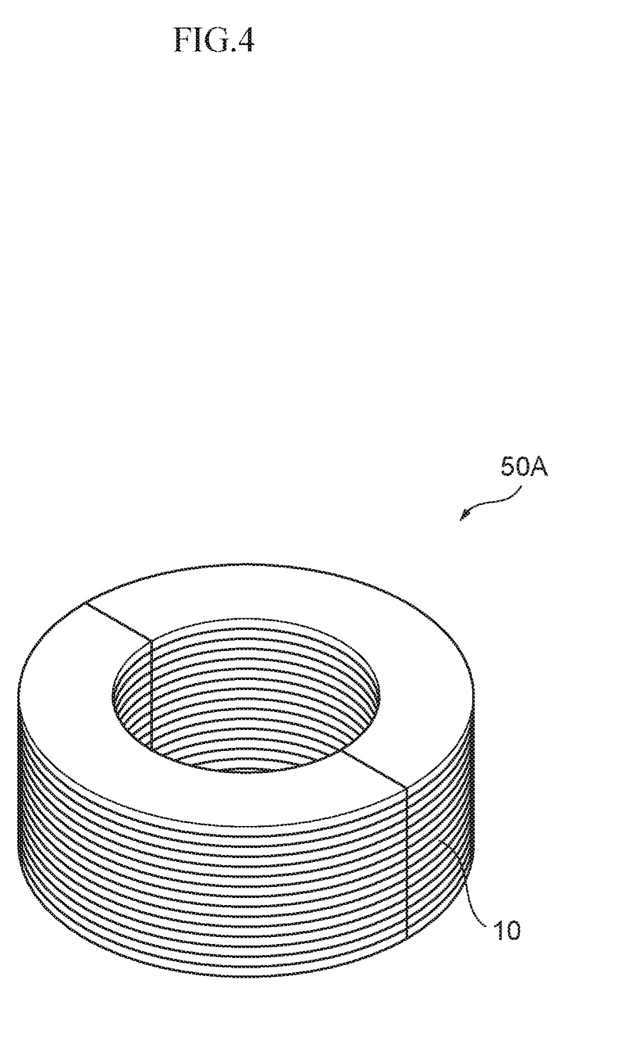
FIG. 4 is a perspective view of the structure of a stator core including the metal sheets produced with the producing apparatus in accordance with the first embodiment of the present disclosure.

The plurality (for example, several thousands) of laminated metal sheets 10 detached from the bars 1 is brought into close contact with each other with a predetermined pressure. At this time, the metal sheets 10 may be tied to each other with a resin such as an adhesive. Then, as illustrated in FIG. 4, the laminated metal sheets 10 are arranged to face each other and fixed together, whereby a stator core 50A is produced. It should be noted that in FIG. 4 and FIG. 5, teeth and slots of the stator core 50A formed by the protruding portions 10a and gaps 10b, respectively, of the metal sheets 10 are omitted for simplicity of the drawings.

Figure 5:
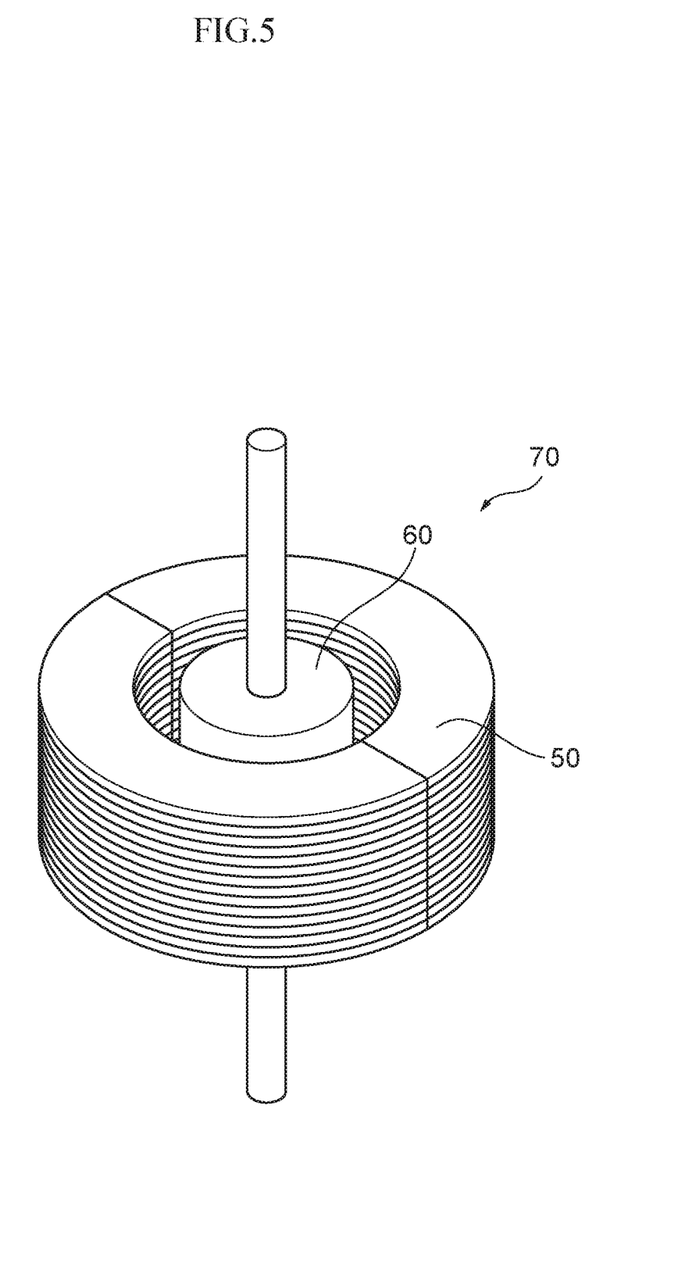
FIG. 5 is a perspective view of the structure of a motor including the metal sheets produced with the producing apparatus in accordance with the first embodiment of the present disclosure.

Next, as illustrated in FIG. 5, a coil (not illustrated) is disposed on the teeth (not illustrated) of the stator core 50A to form a stator 50. The stator 50 and a rotor 60 are disposed in a case (not illustrated), whereby a motor 70 is produced.

As described above, the present embodiment includes a step of separating the plurality of metal sheets 10 from each other using magnetic force and moving the plurality of metal sheets 10 while applying heat treatment thereto. This step can suppress generation of coarse crystals because heat of reaction generated through crystallization would not accumulate, unlike the case where heat treatment is applied to the plurality of metal sheets 10 in a laminated state. As a result, it is possible to avoid decrease in the magnetic properties of the metal sheets 10.

The present embodiment further includes a step of moving the plurality of metal sheets 10 while applying heat treatment thereto so as to allow them to pass by the midstream portions 1b of the bars 1 and a step of sequentially laminating the metal sheets 10 on the downstream portions 1c of the bars 1 after they have passed by the midstream portions 1b. These steps can increase productivity because heat treatment can be continuously applied to the plurality of metal sheets 10. In addition, since the plurality of metal sheets 10 can return to the laminated state after the heat treatment, the metal sheets 10 can be easily detached from the bars 1.

As described above, the metal sheets 10 are adapted to move downstream by the vibrations given to the bars 1 with at least the upstream portions 1a and the midstream portions 1b being inclined downward toward the downstream side. Further, the metal sheets 10 are adapted to be separated from each other by the magnetic force of the magnets 4 that are disposed to extend along the midstream portions 1b and sandwich the midstream portions 1b. These configurations allow the metal sheets 10 attached to the upstream portions 1a of the bars 1 to easily pass by the midstream portions 1b while being separated from each other and then move to the downstream portions 1c.

In the present embodiment, the producing apparatus 100 only needs to have one set of magnets 4 (two magnets 4 herein) and cooling members 6 (two cooling members 6 herein). Thus, the apparatus can avoid having a complicated structure.

Second Embodiment

Figure 6:
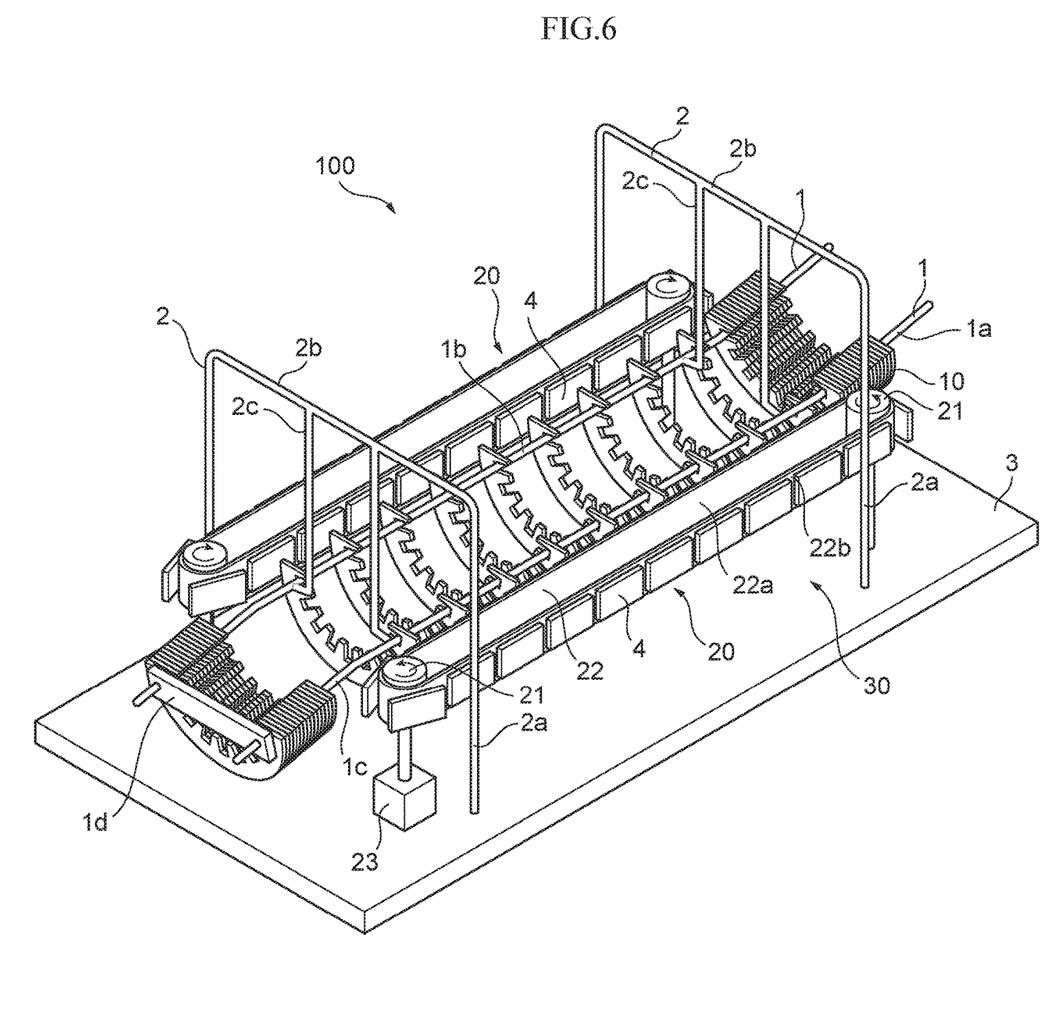
FIG. 6 is a schematic configuration view of a producing apparatus used for producing metal sheets in accordance with a second embodiment of the present disclosure.

Next, a producing apparatus 100 used for producing metal sheets 10 in accordance with a second embodiment of the present disclosure will be described with reference to FIG. 6. In the second embodiment, unlike the first embodiment, the metal sheets 10 are moved by the movement of the magnets 4, instead of the vibrations given to the bars 1.

In the present embodiment, the producing apparatus 100 includes the pair of bars the pair of supporting members 2 supporting the pair of bars 1, the base plate 3 to which the supporting members 2 are fixed, a pair of magnet rotating devices 20 disposed along the pair of bars 1, and the heating device 7. In the present embodiment, the bars 1 and the magnet rotating devices 20 including the magnets 4 form the conveying device 30 that allows the metal sheets 10 being separated from each other to move along the bars 1. It should be noted that the vibrator 5 is not provided in the present embodiment, unlike the first embodiment. In FIG. 6, the heating device 7 is omitted to facilitate understanding.

In the present embodiment, the upstream portions 1a and the downstream portions 1c of the bars 1 are arranged to be inclined downward from the upstream side toward the downstream side. Meanwhile, unlike the first embodiment, the midstream portions 1b are arranged horizontally.

The pair of magnet rotating devices 20 is disposed to extend along the midstream portions 1b of the bars 1 and sandwich the midstream portions 1b from opposing sides in the width direction of the metal sheets 10, which is perpendicular to the direction in which the metal sheets 10 are conveyed. It should be noted that the magnet rotating devices 20 are disposed in parallel with the bars 1.

Each of the magnet rotating devices 20 includes a pair of sprockets 21, an endless rotating member 22 looped over the pair of sprockets 21, a plurality of magnets 4 arranged on the outer periphery of the rotating member 22, and a driving portion 23 including a motor and the like that rotates and drives the sprockets 21.

The rotating member 22 is formed of a metal chain, for example. It should be noted that in FIG. 6, the rotating member 22 is illustrated as a belt for simplicity of the drawing. The rotating member 22 has an outbound portion 22a (the inside portion in the width direction) closer to the bar 1 and a return portion 22b (the outside portion in the width direction) distant from the bar 1 and rotates such that the outbound portion 22a moves from the upstream side to the downstream side, and the return portion 22b moves from the downstream side to the upstream side.

The plurality of magnets 4 is fixed to the outer periphery of the rotating member 22. Herein, only the center of each magnet 4 in the longitudinal direction is fixed to the outer periphery of the rotating member 22. Rotation of the rotating member 22 causes the magnets 4 to move along the bar 1. It should be noted that in the present embodiment, the magnets 4 pass through a high-temperature portion heated by the heating device 7 (the outbound portion 22a of the rotating member 22), and then pass through a portion not heated by the heating device 7 (the return portion 22b of the rotating member 22). Accordingly, it is possible to suppress an excessive temperature rise of the magnets 4, and thus the cooling members 6 need not be provided.

The other configurations of the producing apparatus 100 of the second embodiment are the same as those of the first embodiment.

Next, a method for producing the metal sheets 10 using the producing apparatus 100 will be described.

Attaching Step

As in the first embodiment, the plurality of metal sheets 10 made of amorphous soft magnetic material in a laminated state is attached to the upstream portions 1a of the bars 1. The metal sheets 10 in the laminated state slide down by their own weight to the downstream ends of the upstream portions 1a (the upstream ends of the midstream portions 1b). It should be noted that the upstream portions 1a of the present embodiment may have a greater inclination as compared to the upstream portions 1a of the first embodiment, so that the metal sheets 10 can easily slide.

Heat Treatment Step

When the sprockets 21 rotate to move the magnets 4, at the upstream ends of the outbound portions 22a, the adjacent metal sheets 10 repel each other due to the magnetic force acting on the metal sheets 10 in the laminated state and only one metal sheet 10 is separated from the laminated metal sheets 10. This metal sheet 10 is attracted by the magnets 4 due to the magnetic force and moves downstream along the bars 1 in synchronization with the movement of the magnets 4. The plurality of metal sheets 10 moves along the bars 1 with a predetermined gap therebetween by the magnetic force of the magnets 4 traveling in turn.

As in the first embodiment, the metal sheets 10 are subjected to heat treatment by the heating device 7 while passing by the midstream portions 1b of the bars 1, and the amorphous soft magnetic material is crystallized into nanocrystal soft magnetic material. It should be noted that the heat treatment time for the metal sheets 10 can be easily set to a predetermined period of time by changing the rotation rate of the magnet rotating devices 20.

Laminating Step

Each of the magnets 4 reaches the downstream sprocket 21 and moves from the outbound portion 22a to the return portion 22b. At the same time, the metal sheets 10 having been conveyed by the magnets 4 become free from the magnetic force of the magnets 4. Then, the metal sheets 10 are pushed by their own weight or by the following metal sheets 10, and then move downstream along the downstream portions 1c, so as to be sequentially laminated.

The other configurations of the method for producing the metal sheets 10 of the second embodiment are the same as those of the first embodiment.

As described above, in the present embodiment, the magnets 4 arranged to sandwich the midstream portions 1b are adapted to move from the upstream side to the downstream side along the midstream portions 1b, so as to separate the metal sheets 10 from each other with the magnetic force of the magnets 4 and move the metal sheets downstream. This allows the metal sheets 10 attached to the upstream portions 1a of the bars 1 to easily pass by the midstream portions 1b while being separated from each other and then move to the downstream portions 1c. Further, controlling the moving speed of the magnets 4 can easily control the heat treatment time of the metal sheets 10. This configuration is particularly useful for the material requiring strict management of the heat treatment time.

Every aspect of the embodiments of the present disclosure is only exemplary, and the present disclosure should not be limited thereto. The scope of the present disclosure should be defined by the scope of the claims, not the descriptions of the aforementioned embodiments. Further, the present disclosure includes all changes that are within the meanings equivalent to the scope of the claims and are within the scope of the present disclosure.

For example, although the above embodiment illustrates the example in which the downstream portions 1c of the bars 1 are inclined downward toward the downstream side, the present disclosure is not limited thereto. The downstream portions 1c may be arranged in the horizontal position.

Further, although the second embodiment illustrates the example in which the midstream portions 1b of the bars 1 are arranged in the horizontal position, the present disclosure is not limited thereto. The midstream portions 1b may be arranged to be inclined downward toward the downstream side.

Further, although the second embodiment illustrates the example in which the metal sheets 10 move (slide down) by their own weight along the upstream portions 1a, not by the vibrator 5, the present disclosure is not limited thereto. As in first embodiment, the vibrator 5 may be provided so that the metal sheets 10 move along the upstream portions 1a by the vibrations.

Further, although the first embodiment illustrates the example in which the vibrator 5 causes the metal sheets 10 to move, while the second embodiment illustrates the example in which the magnets 4 (the magnet rotating devices 20) cause the metal sheets 10 to move, the present disclosure is not limited thereto. For example, magnets may be disposed only around the connecting portions between the upstream portions 1a and the midstream portions 1b of the bars 1, and the magnets may cause the metal sheets 10 to be separated from each other, and sheet engagement pieces adapted to engage with the metal sheets 10 may be provided instead of the magnets 4 of the magnet rotating devices 20, so that the sheet engagement pieces cause the metal sheets 10 to move along the bars 1.

What is claimed is:

1. A metal sheet producing method for producing metal sheets by applying heat treatment to metal sheets made of amorphous soft magnetic material while conveying the metal sheets along a bar and thus crystallizing the amorphous soft magnetic material into nano-crystal soft magnetic material, the method comprising:
   attaching the plurality of metal sheets in a laminated state to an upstream portion of the bar;
   separating the plurality of metal sheets from each other using magnetic force and moving the metal sheets while applying the heat treatment thereto so as to allow the metal sheets to pass by a midstream portion of the bar; and
   sequentially laminating the metal sheets that have passed by the midstream portion on a downstream portion of the bar.

2. The metal sheet producing method according to claim 1, wherein the metal sheets are moved downstream by vibrations given to the bar with at least the upstream portion and the midstream portion being inclined downward toward a downstream side, and further, the metal sheets are separated from each other by magnetic force of magnets that are disposed to extend along the midstream portion and sandwich the midstream portion.

3. The metal sheet producing method according to claim 1, wherein the magnets that are disposed to sandwich the midstream portion are moved from an upstream side to a downstream side along the midstream portion, so as to separate the metal sheets from each other with the magnetic force of the magnets and move the metal sheets downstream.

* * * * *